Figure 1:
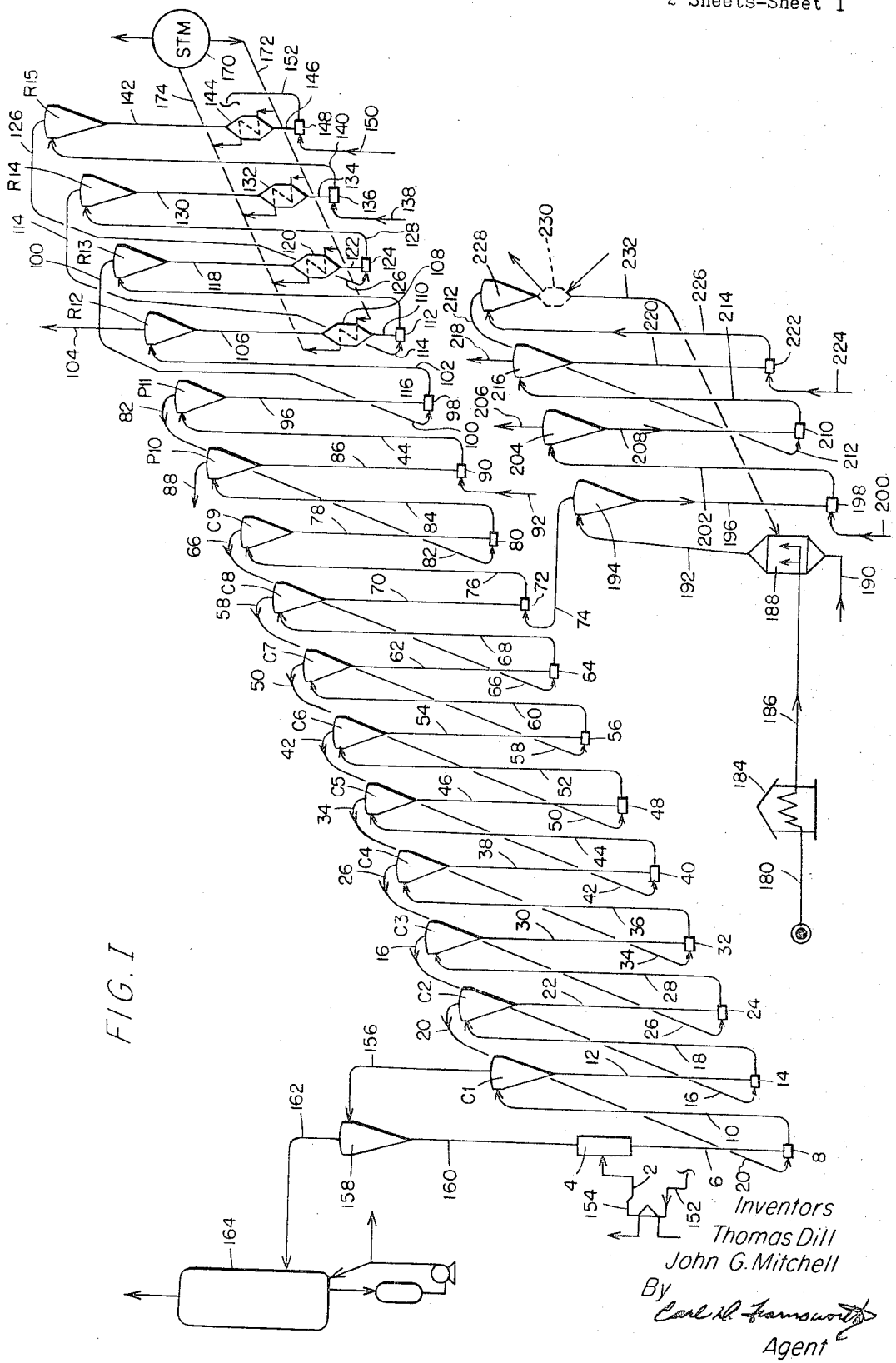

Oct. 17, 1967  T. DILL ET AL  3,347,778
METHOD AND SYSTEM FOR CRACKING HYDROCARBONS
Filed March 12, 1965  2 Sheets-Sheet 2
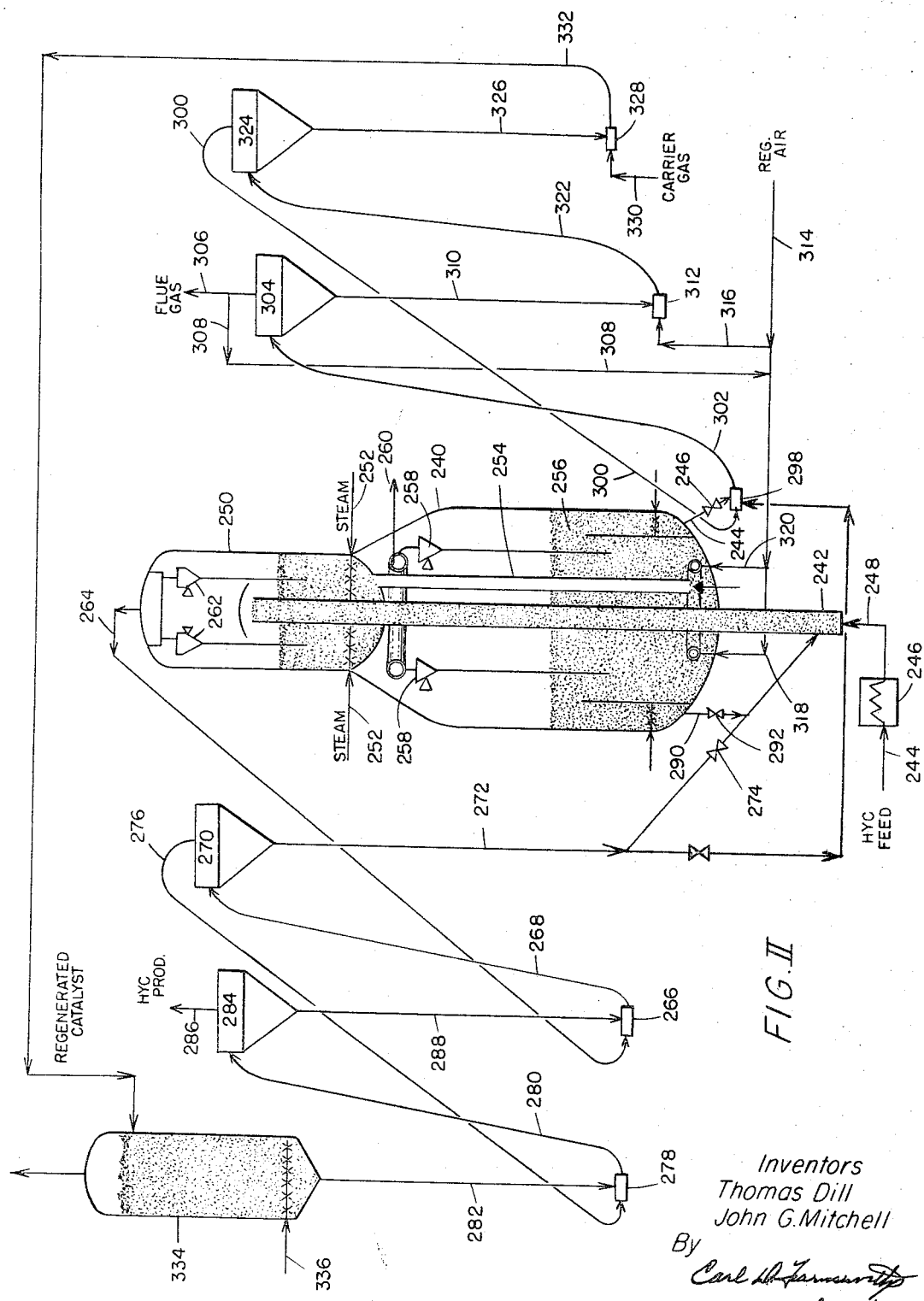
FIG. II
Inventors
Thomas Dill
John G. Mitchell
By
Carl A. Farnsworth
Agent

United States Patent Office 3,347,778
Patented Oct. 17, 1967

3,347,778
METHOD AND SYSTEM FOR CRACKING HYDROCARBONS
Thomas Dill, Westport, Conn., and John G. Mitchell, Larchmont, N.Y., assignors to Mobil Oil Corporation, a corporation of New York
Filed Mar. 12, 1965, Ser. No. 439,209
2 Claims. (Cl. 208—74)

This application is a continuation-in-part of application Ser. No. 366,475, filed May 11, 1964.

This invention relates to the catalytic conversion of hydrocarbons to products including lower and higher boiling hydrocarbon materials. In a more particular aspect, the invention relates to the catalytic cracking of hydrocarbons in the presence of at least a plurality of catalytic cracking steps generally arranged to provide for countercurrent flow of catalyst to hydrocarbon reactant in stages and of decreasing temperature in the direction of hydrocarbon reactant flow.

It is known to crack hydrocarbon feed material in the presence of fluidized catalyst particles in many different arrangements of fluid catalyst suspensions including dense and dilute phase suspensions or combinations thereof. During cracking in any one of these arrangements the catalyst mass becomes fouled or contaminated with hydrocarbonaceous material which reduces the activity of the catalyst thereby necessitating stripping and/or regeneration of the catalyst to restore catalyst activity.

It has been observed in these prior art processes that they all contain many inherent disadvantages contributing to excessive coke make, production of low grade product, ineffective usage of the catalyst particularly with respect to its activity, incomplete effective restoration of catalyst activity during regeneration thereof and in addition to other things usage of unnecessarily large quantities of the catalyst mass as a heat source to circumvent some of the problems mentioned above. As a result thereof, in these prior art processes including fluid bed, moving bed and known riser cracking operations or combinations thereof, the conditions of vapor-catalyst contact is usually selected for the average activity of the catalyst mass which is well known as a mixture of catalyst particles having a wide range of activities. That is, in the prior art the initial oil feed or fresh feed usually contacts an excessive amount of catalyst at the highest temperature and, consequently, may be over-cracked to gas and coke. Furthermore, as the cracking operation is continued, coke deposition on the catalyst tends to reduce the catalyst activity whereby the catalyst becomes less effective to accomplish the desired cracking. In one of the known prior art arrangements, such as passing a suspension of oil vapors and catalyst through a cracking zone often referred to as a riser cracking zone, wherein catalyst particles generally of non-uniform activity are used, excess temperature and amounts of catalyst are required thereby contributing to the difficulties of producing desired product material. Accordingly, it may be said that these prior art methods and systems of operation all have inherent disadvantages in that they rely upon use of a large mass of catalyst having a wide range of catalyst particle activity at temperature most suitable for converting hydrocarbons at the average activity of the catalyst mass. Therefore, the temperature of the mass will be above that required for the catalyst particles of above average activity thereby causing over cracking to undesirable coke and gaseous products. Conversely, the same temperature will be too low to promote the desired cracking for that mass of catalyst particles having activities below the average activity of the mass. The combined effect of this undesired prior art method of operation requires most usually the use of an excess amount of catalyst to obtain a desired conversion. In addition to the above, the prior art fluid and moving bed processes are not particularly suitable for high activity catalyst composition since they do not permit regulation and segregation of temperature and catalyst to oil ratio to take advantage of catalyst particles of high activity to achieve a desired conversion.

It is an object of this invention to provide an improved method and arrangement of process steps for effectively cracking hydrocarbon feed material in the presence of catalyst particles of exceptionally high cracking activity.

A further object of the invention is to provide an improved method for cracking hydrocarbon oil with a suspended catalyst which will more effectively utilize the catalyst activity.

Other objects and advantages of this invention will become more apparent from the following description.

This invention relates to a method and arrangement of processing steps for maintaining catalyst particles therein of substantially more uniform activity in any one particular contact step and using an amount of catalyst limited primarily to catalyze the extent of reaction desired therein. That is, by the present invention, the amount of catalyst employed in any one hydrocarbon conversion step under the reaction conditions employed is generally insufficient to supply more than a minor portion of the desired reaction heat while the activity of the individual catalyst particles employed in that step is more uniformly maintained whereby more effective and efficient utilization of the catalyst activity in that part of the process is permitted.

In accordance with the method and process of this invention, finely divided fluidizable catalyst particles of a suitable catalytic activity are employed for the conversion of hydrocarbons in a plurality of interconnected reaction zones comprising at least a plurality of relatively dilute catalyst phase reaction zones. The catalyst, therefore, is maintained as a once through turbulent suspended catalyst phase passing through each reaction zone in contact with a vaporous hydrocarbon therein to be converted. The hydrocarbon-catalyst suspension thus formed is separated at the end of each reaction zone so that catalyst particles of decreased activity are passed therefrom to the next succeeding reaction zone and sequentially through said plurality of reaction zones generally countercurrent to the flow of hydrocarbon feed and reactant product through the plurality of reaction zones.

In the method of this invention, the fresh hydrocarbon feed is introduced, for example, to a more conventional cracking zone of the prior art and containing catalyst of a lesser activity. A partially converted feed or desired product therefrom such as one boiling above gasoline boiling range hydrocarbons is thereafter passed to a contact zone containing catalyst of higher activity wherein the temperature may be equal to, above or below that employed in the preceding step. The catalyst removed from the first reaction zone used for contacting the fresh feed and generally being catalyst of the lowest activity containing adsorbed hydrocarbonaceous material is thereafter passed through one or more, for example, a combination of stripping zones. The stripping zones may be one or more dilute phase and/or dense phase combinations of stripping zones maintained at an elevated stripping temperature. It is contemplated passing freshly regenerated catalyst in contact with one or more of the stripping zones either directly or indirectly to provide heat thereto in addition to the heat supplied by the stripping gas. Under some conversion conditions and depending in part upon the activity of the catalyst employed, freshly regenerated catalyst may be added diectly to one or more of the stripping zones to facilitate conversion and removal of entrained hydrocarbonaceous material carried thereinto from the fresh feed or initial reaction zone. The thus stripped catalyst is thereafter passed to one or more catalyst regeneration steps which may be a combination of riser and dense phase regeneration steps. In any event, the stages of regeneration are arranged and operated under conditions to effect a desired removal of carbonaceous material from the catalyst and it may be substantially complete or partial removal of carbonaceous material from the individual catalyst particles. Accordingly, in one embodiment the regeneration section may be a plurality of sequentially connected regeneration sections through which the catalyst particles sequentially move in dilute and/or dense phase condition for contact with regeneration gas under conditions of severity sufficient to effect ever increasing removal of adsorbed carbonaceous material from the catalyst up to substantially complete removal from the catalyst particles. On the other hand, a dense phase regeneration zone comprising a dense fluid bed of catalyst in a standpipe may be placed intermediate any two dilute phase regeneration zones to permit a relatively severe countercurrent regeneration step.

In the method and arrangement of contact steps herein described it is contemplated employing standpipe connected dilute phase catalyst contact zones discharging into suitable catalyst-vapor separation zones such as a large cyclone separator arranged sequentially in a plurality of steps to carry out the catalyst flow desired and described herein. These dilute phase catalyst contact zones may be used in a vertical, horizontal or inclined position to move the catalyst particles through the sequence of steps herein contemplated.

In the arrangement and sequence of processing steps briefly outlined above, it is contemplated employing substantially any activity cracking catalyst since the essence of this invention is directed to utilizing the activty of the catalyst provided in its most efficient manner. It is preferred, however, to employ catalysts in a substantial portion of the process possessing activity substantially in excess of amorphous silica-alumina catalyst either naturally occurring or synthetically prepared and comprising catalytically active crystalline aluminosilicates in combination with an inert matrix or the less active cracking component such as naturally occurring or synthetically prepared siliceous materials such as silica-alumina, silica-zirconia, silica-magnesium which may be made substantially catalytically inert when desired. In a preferred embodiment of this invention, the catalytically active crystalline aluminosilicate is combined with an inert material or catalytic material of lesser activity such as amorphous silica-alumina in an amount less than about 25% by weight and most usually less than about 15% by weight. In any event, the selected catalytic material to be used for cracking is introduced and transferred under conditions in the system which utilizes its activity most effectively for converting hydrocarbon material to desired products. In this respect, therefore, the number of turbulent dilute phase cracking steps and conversion conditions employed in any one step are selected to substantially optimize conversion conditions for the catalyst activity therein and hydrocarbon feed to be converted in contact therewith. The arrangement of steps and method of this invention also permits adjusting the temperature condition employed in each reaction step to that most suitable for utilizing the activity of the catalyst passing therethrough and this in conjunction with the essence of this invention is a major departure from the prior art.

It should be apparent from the above that a fairly wide choice in the number of dilute catalyst phase reaction zones is available depending on the activity of the catalyst employed and the conversion desired so that it is not essential to limit this application to any particular number of hydrocarbon conversion stages, stripping stages and regeneration stages. It is applicants' view that the number of stages of cracking employed will be dependent upon the catalyst activity in any particular stage, the particular feed to be converted therein and the reaction conditions of time and temperature for a given catalyst to avoid undersired over cracking. Therefore, it is considered preferable to provide a plurality of sequentially connected conversion stages which are independently adjustable for reactant contact time, temperature, and catalyst to oil ratio to accomplish a desired limited conversion since for different catalyst and/or feeds these conditions could vary considerably. Furthermore, it is contemplated separating the vaporous product material recovered from any one stage of cracking so that only the more refractory and insufficiently converted portion of the hydrocarbon feed can be passed to a cracking zone in the series containing catalyst of a higher cracking activity for conversion therein to more desired products.

It can be seen, therefore, that in the process of this invention an arrangement of processing steps is provided which permits converting components of the hydrocarbon feed most easily converted by contact initially with the most inactive cracking catalyst and thereafter contacting more refractory products of this initial conversion step and requiring further conversion with catalyst of a higher activity in one or more other contact zones. By the method herein provided, the more refractory components of the feed which are incompletely converted to desired products upon contact with catalyst of lowest activity are passed in contact with catalyst of increasing activity maintained as herein described until selective conversion thereof to desired products is accomplished.

It may be said, therefore, that in the arrangement herein described the cracking zones containing the most active cracking catalyst will be at a lower temperature than the zone containing the most inactive catalyst and this arrangement and method of operation is a major departure from the prior art conversion systems since they rely upon employing the higher temperatures with the most active catalyst.

The method and procedure of this invention is permissible in part because of the overall more uniform activity of the catalyst employed in any individual contact step, the extent of conversion accomplished in each conversion stage and the countercurrent flow of hydrocarbon reactant and catalyst through the process to accomplish selective conversion of incompletely converted feed material components and products thereof. Furthermore, the process of this invention generally employs lower cracking temperatures for the most active catalyst and higher temperatures in those stages of lower catalyst activity and this is particularly true whether the cracking catalyst employed has a cracking activity substantially equal to or above the prior art cracking catalysts. That is, applicants' method permits the use of higher temperatures with catalyst of relatively low activity in any one stage over that permissible in prior art process, the use of a much smaller amount of catalyst, contact time adjusted on the basis of catalyst activity, generally smaller catalyst inventory in any one step as well as in the total process which permits use of smaller processing equipment of much simpler design and construction.

By those skilled in the art, it will be immediately recognized that many variations of equipment and arrangement of process steps may be developed for accomplishing the sequence of processing steps herein disclosed to practice the essence of this invention. However, it is preferred in any of these arrangements that the catalyst temperature in any one cracking step be maintained at least as high as the temperature of the fresh catalyst introduced to the last cracking step in the sequence of steps and that increasing temperatures be employed in the direction of catalyst flow through the conversion steps up to at least the stripping section and possibly the regeneration section of the process. To provide at least part of the temperature control desired according to this invention, it is contemplated in one embodiment of passing the freshly regenerated catalyst in indirect heat exchange with the catalyst used in one or more sections. That is, it is contemplated passing catalyst from the regeneration section in countercurrent flow and in indirect heat exchange with, for example, the catalyst stream passing through the plurality of reaction zones so that heat may be given up indirectly to each stage of cracking or with the hydrocarbon reactant feed, for example, to effect preheating thereof. It is contemplated in a further embodiment of using catalyst at an elevated temperature and obtained from the regeneration zone in indirect heat exchange with partially used catalyst in the standpipes intermediate the dilute catalyst phase reaction zones. Accordingly, by any one of these arrangements, the heat carrying regenerated catalyst recovered from the last zone in the regeneration section is cooled to a desired lower temperature for introduction to the first of the dilute phase high activity hydrocarbon conversion steps.

In the method and system of operation herein described, it is preferred to carry out the hydrocarbon contact steps at a temperature above the dew point of hydrocarbons converted in contact with the catalyst so that little, if any, wetting of the catalyst occurs. Under the conditions of operation preferred herein, the conditions and method of operation are selected with at least the most active catalyst which minimize deposition of carbonaceous material on the catalyst requiring removal by burning. Furthermore, the very essence of one embodiment of the invention, particularly when using high activity crystalline aluminosilicates as the cracking catalyst, is directed to a sequence of processing steps employing a relatively small catalyst inventory, and, therefore, an inherenty low heat carrying capacity. Under such conditions it may be necessary, therefore, to provide additional heat yielding facilities in the system and this may be provided by any number of ways including furnace feed heat zones, jacketed catalyst contact zones indirectly heated by a suitable fluid heat exchange medium or any other available method adequate for the purpose.

It can be seen from the general discussion hereinbefore provided that the method and essence of this invention is directed in part to using catalyst which is separated into gradations of activity for effecting a controlled and substantially optimized conversion of components of the hydrocarbon feed to desired product. Accordingly, the method herein described may be considered as permitting a selective conversion of the feed constituents in a manner which will minimize production of any undesired gas and coke product by providing the ability of control reaction rates and temperatures for gradations in activity of separated catalyst. Furthermore, it can be seen from the above that efficient use is made of the sensible heat of product vapors from one conversion step to supply all or a portion of the heat required in a second conversion step employing catalyst particles of a higher gradation activity. Therefore, the method and arrangement of processing steps of this invention permits separating for the first time, the interdependency of catalyst to oil ratio and reaction heat supply to achieve a desired conversion whereas the prior fluid and moving bed processes are substantially completely dependent on the catalyst to oil ratio to supply conversion heat required in the process.

In the arrangements shown and more fully described hereinafter, the catalyst is caused to move generally through the sequentially connected cyclone separators under conditions to cause a gradual rise in pressure in the direction of catalyst flow so that the pressure of cyclone separator $C_1$, FIGURE 1, is substantially below the pressure of cyclone separator $R_{15}$. In addition to the rise in pressure in the direction of catalyst flow, the temperature of the catalyst is also caused to rise in the direction of catalyst flow at least through the conversion section by the hydrocarbon vapors passed therethrough generally countercurrent to the catalyst flow. That is, in accordance with this invention the regenerated catalyst of highest activity is cooled to a desired low temperature prior to entering the conversion section and the fresh hydrocarbon vapor feed is introduced to the hydrocarbon conversion step containing catalyst generally of the lowest activity. Thereafter the hydrocarbon vaporous product including products of conversion are passed in contact with catalyst particles of a higher activity in a separate series of contact sections maintained at lower temperature conversion conditions in the direction of hydrocarbon flow to provide the general countercurrent flow in the conversion section as herein described. Accordingly, by this arrangement and method of operation, the catalyst of highest activity is employed under the lowest conversion temperature conditions preferably in a riser dilute catalyst phase contact step discharging into, for example, a cyclone separator. The first hydrocarbon conversion contact step wherein the catalyst is at its lowest activity is employed generally at the highest conversion temperature for contact with the fresh feed. Therefore, in the arrangement of conversion steps described herein, the vaporous hydrocarbons are employed to supply a large portion if not a major portion of the required heat of reaction to obtain at least about 20% conversion of the vaporous hydrocarbons in one or more of the conversion steps. It is contemplated operating, however, under conditions to obtain at least 50% conversion and even as high as or greater than 70% conversion of introduced hydrocarbon feed in the combination of cracking steps. It is not essential to the process that the extent of conversion be the same in each step and it may vary considerably between steps since the extent of conversion in any one step will be dependent upon the catalyst activity employed therein, the temperature and the amount of available hydrocarbon constituents which can be converted under the particular conditions provided. Accordingly, as a general rule, the conversion conditions in any one stage will be maintained below that tending to over convert the hydrocarbons to undesired constituents while obtaining an overall conversion in the plurality of contact steps of at least 60%. Under some conditions of operation, it is contemplated obtaining up to about 100% conversion.

The processing schemes specifically discussed herein may be the subject of numerous variations and embodiments coming within the principles of the essence of the invention herein described. That is, the feed preheat may be effected in part at least in the presence of inert or finely divided catalytic material having cracking and/or hydrogenating activity so that controlled and limited cracking of the fresh feed may be carried out either with or without the presence of hydrogen. That is, the sequence of catalytic conversion steps may be considerably reduced so that not more than a few, two or three, stages of conversion are provided and this will be controlled in part by the extent of conversion desired to be accomplished in each conversion stage. Generally speaking, it is preferred to limit the extent of conversion effect in any one stage to less than about 30% and more usually not substantially above about 20% in any one conversion stage.

Furthermore, the process may be modified to include additional stages of stripping with more or less stages of regeneration in either the catalytic or inert contact material stages of the above described process. The number employed is not particularly critical except that sufficient are provided to accomplish the results desired for any particular combination of catalyst and hydrocarbon feed to be processed in the combination of steps.

In addition, it is contemplated operating the combination of processing steps under different combinations of temperature and pressure conditions which may be lower and even higher than those specifically recited above. That is, the hydrocarbon feed may be introduced to the first hydrocarbon conversion step of the process at a temperature not substantially above that required to supply the reaction heat and maintain the hydrocarbon in a vaporous condition. Thereafter, vaporous hydrocarbon is passed through the remaining conversion steps without appreciable temperature drop by adding heat to the vaporous material between two or more stages in an amount sufficient to makeup the conversion heat loss. On the other hand, the freshly regenerated catalyst introduced to the conversion zone of highest catalyst activity may be at an elevated temperature sufficient to supply a portion of the reaction heat required therein rather than depending upon the vaporous hydrocarbon material passed thereto for all the reaction heat. However, in any of these combinations, it is to be noted that the high activity catalyst in the dilute phase steps is not relied upon as a heat sink to maintain the hydrocarbon material in a vaporous condition or to furnish the reaction heat required in the system. Accordingly, by the method of this invention, the extent of conversion accomplished in any one stage may be limited substantially as desired to control over cracking to undesired product materials within desired low limits. In any of these combinations, it is important that the hydrocarbon material to be converted and desired products thereof be maintained in at least the catalytic conversion section of the process in vaporous condition to minimize undesired entrainment of hydrocarbon material with catalytic material.

Although not specifically shown in the drawing primarily for the purpose of simplifying the drawing it is contemplated providing suitable interconnecting conduit between two or more of the plurality of conversion stages which will permit bypassing one or more stages of conversion with respect to hydrocarbon vaporous flow through the system thereby providing means for controlling the stages of conversion to which the hydrocarbon vapors may be subjected. It is also contemplated in this embodiment of recycling gasoline product from a product fractionator to one or more of the high activity catalytic conversion stages bypassed as described above to obtain octane improvement in the product gasoline obtained in the process. For example, one or more of the most active catalyst stages may be employed to improve the gasoline product octane and the conversion temperature employed may be independently adjusted by heating the gasoline feed to a temperature suitable for the activity of the catalyst employed therein. In this embodiment, it is further contemplated combining a portion of the naphtha product or a straight-run distillate material with the vaporous hydrocarbon feed introduced to the conversion steps of the process. It has been found when operating in this manner that not only is there an increase in yield of desired gasoline product but a significant increase in gasoline octane value is possible accompanied by a desirable reduction in gas and coke yields. On the other hand, significant improvement in the process may also be achieved by combining light hydrocarbon diluent materials such as wet gases, natural gases and hydrogen-rich gases with the hydrocarbon feed in an amount to cause a significant reduction in the partial pressure of the hydrocarbon feed or the diluent material may be substantially inert to the process.

In yet another embodiment of the process herein described, it is contemplated separating the vaporous hydrocarbon in an intermediate portion of the catalytic conversion system to remove desired low boiling constituents therefrom so that only the remaining higher boiling portion thereof is subject to catalytic conversion with the more active catalyst in the remaining conversion steps.

When practicing any one of the embodiment in the catalyst system herein described advantage may be taken of further heating one or more of the separated fractions for return to the system to supply desired reaction heat thereto. It is further contemplated in a variation of the above of separating the fresh feed after initial preheating to an elevated temperature into a lower boiling vaporous fraction from a higher boiling liquid portion of the preheated fresh feed. The thus obtained lower boiling fresh feed is thereafter subjected to super heating conditions and employed in a super heated condition to elevate the temperature of the catalyst passed to the first hydrocarbon conversion step. The heat thereby supplied is in an amount sufficient to obtain desired catalytic conversion of the super heated vapors in addition to conversion of the higher boiling portion of the fresh feed passed thereafter in contact with the catalyst downstream of the point of contact with the super heated vapors. In this embodiment it is further contemplated introducing the super heated vapors to the moving catalyst system one or more contact steps removed from the conversion step selected for introducing the higher boiling portion of the fresh feed and this selection will be governed in part by the type of conversion catalyst employed in the system, the catalyst to oil ratio employed and the extent of conversion desired in any one step. In either of these arrangements, it is also contemplated within the scope of this invention of adding higher boiling hydrocarbon material such as a residual oil or a reduced crude to one or more of the catalytic conversion steps of substantially reduced catalyst activity prior to the stripping step to obtain at least partial conversion thereof and deposition of carbonaceous material on the catalyst in an amount which will be sufficient upon burning in an oxygen atmosphere to provide at least a major portion of the heat required in the sequence of conversion steps either by direct or indirect means.

Accordingly, an important aspect of this invention resides in the initial handling of the fresh hydrocarbon feed to heat the same to a sufficiently high elevated temperature up to about 1050° F. and effect at least partial conversion thereof for processing the catalytic contact steps provided. In one arrangement, the hydrocarbon feed such as a gas oil is passed through a preheat furnace wherein the gas oil is heated to an elevated temperature up to about 830° F. to obtain at least partial vaporization thereof. Thereafter the heated feed is passed in contact with a mass of hot contact material maintained at an elevated temperature sufficient to complete vaporization and effect at least partial conversion of the hydrocarbon feed introduced thereto. A plurality of desired functions are accomplished in this initial solids contact zone which includes among other things, removing high boiling coke forming constituents from the feed as well as contained metal contaminants. Accordingly, the initial contact of hydrocarbon feed may be with catalytic or relatively inert solid contact material and may be accomplished in any well-known system for converting hydrocarbons to desired products such as fluid, moving bed and riser contact systems. It is preferred to employ a system which permits use of a fluidizable particulate material. Therefore, since the initial solids contact system may be operated under conditions primarily to complete vaporization of the feed and removal of undesired coke forming constituents, the operating conditions may be less critical and, therefore, less severe than normally required for cracking hydrocarbons, the inert contact material or catalyst used therein may be employed with a higher level of coke on the catalyst and a significant increase in hydrocarbon feed throughput is, therefore, possible without requiring a significant increase in the severity of operating conditions employed therein. Accordingly, the present invention may be said to be directed to effecting a substantially significant hydrocarbon throughput increase in an existing unit without adversely affecting its operation with undesired conditions of severity.

Referring now to FIGURE 1 by way of example, freshly regenerated catalyst adjusted to a desired low temperature of the order of about 685° F. is introduced by conduit 2 to a carrier gas disengaging zone 4 wherein it is combined with catalyst particles separated from the hydrocarbon conversion products removed from the last catalyst contact zone. The freshly regenerated catalyst is removed from zone 4 by standpipe 6 for passage to hydrocarbon catalyst mix zone 8 wherein an amount of the highest activity cracking catalyst is combined with the vaporous hydrocarbon to form a suspension of desired catalyst concentration. Of course, the catalyst to oil ratio employed to form the suspension will vary with the particular catalyst employed so that high activity aluminosilicate catalyst will be used in considerably lower concentrations than amorphous silica-alumina cracking catalyst of considerably lower activity.

The suspension formed in mix zone 8 is thereafter passed through a conversion zone represented by conduit 10 and eventual discharge in cyclone separator zone $C_1$ maintained at a pressure in this specific example of about 8 p.s.i.g. In separator zone $C_1$ which may be one or more sequentially and/or parallel connected cyclone separators, the vaporous hydrocarbons passed thereinto with the catalyst is separated from the catalyst for eventual passage to the product fractionator in the recovery section of the process. The catalyst separated in separation zone $C_1$ is withdrawn through pressure building standpipe 12 of a length to provide a pressure increase at the base of the standpipe of about 6 pounds. The catalyst in standpipe 12 is passed to a mix zone 14 wherein it is combined with vaporous hydrocarbons introduced by conduit 16 to form a desired catalyst oil suspension as described hereinbefore. It will be recognized in view of the discussion above that the vaporous hydrocarbons in conduit 16 may comprise some fresh feed components in addition to those which have undergone partial or complete conversion in another contact step at a higher temperature with catalyst particles of lower activity. That is, it is contemplated in the method herein described of having a portion of fresh vaporous hydrocarbon feed pass through the sequence of conversion steps primarily as a heat carrying medium without undergoing any appreciable conversion therein. On the other hand, the sequence of conversion steps and conditions maintained therein are generally of an order which will cause at least partial conversion of the fresh and/or conversion products obtained therefrom.

The suspension found in mix zone 14 is thereafter passed through a conversion zone represented by conduit 18 for discharge in separator $C_2$. The hydrocarbon vaporous products separated in $C_2$ are withdrawn by conduit 20 for passage to mix zone 8 described above whereas the separated catalyst of reduced activity but at a higher temperature, is withdrawn by a pressure building standpipe 22. The catalyst in standpipe 22 is passed to mix zone 24 wherein it is combined with hydrocarbon material in conduit 26 recovered from a hydrocarbon conversion step hereinafter described. The suspension formed in mix zone 24 is passed through conversion zone 28 for discharge in separator $C_3$. Hydrocarbon conversion products are removed from separator $C_3$ by conduit 16 and passed to mix zone 14 for contact with catalyst particles of higher activity. Separated catalyst is removed from separator $C_3$ by standpipe 30 for passage to mix zone 32. Incompletely converted hydrocarbon vapors in conduit 34 are combined with catalyst in mix zone 32 to form a desired suspension for passage through a riser reactor represented by conduit 36 and eventual discharge in separator $C_4$. Vaporous hydrocarbons are removed from separator $C_4$ by conduit 26 for use in the process as described above with the catalyst being withdrawn by standpipe 38 for passage to a mix zone 40 similar to the mix zones hereinbefore described. In mix zone 40 a desired suspension of catalyst particles in hydrocarbon vapors introduced by conduit 42 is formed for passage through conversion zone 44 under conditions to effect at least partial conversion of the vaporous hydrocarbons. Conversion zone 44 discharges into separator $C_5$ from which vaporous hydrocarbons are recovered by conduit 34. Catalyst particles are withdrawn from separator $C_5$ by standpipe 46 for passage to mix zone 48. In mix zone 48 hydrocarbon vapors introduced by conduit 50 at a temperature above the temperature of the catalyst in standpipe 46 heat the catalyst combined therewith to form a suspension of higher temperature than any of the above described suspensions. The thus formed suspension is passed through an elongated conversion zone 52 discharging into separator $C_6$ to effect at least partial conversion of the vaporous hydrocarbon feed. Hydrocarbon vaporous material is removed from $C_6$ by conduit 42 and the separated catalyst is removed by a standpipe 54 discharging into a mix zone 56. The sequence of steps described above are continued through separators $C_7$, $C_8$ and $C_9$ provided with suitable connecting conduits 50, 60, 62, 58, 68, 70, 66, 76, 78 and mix zones 64 and 72.

In the sequence of contact or conversion steps discussed above, mix zone 72 provides the initial point of contact of the vaporous hydrocarbon feed to be converted with the catalyst withdrawn by standpipe 70 and also the highest temperature zone in the series of hydrocarbon conversion zones. That is, in the specific embodiment herein described, the vaporized heat carrying hydrocarbons at an elevated temperature up to about 1050° F. and heated thereto in the manner hereinafter described, are combined with catalyst of reduced activity because of previous use in the system. Furthermore, this catalyst because of its countercurrent sequential flow through the conversion sequence has been heated to an elevated temperature, sufficient to avoid excessive cooling of the fresh vaporous hydrocarbon feed. Accordingly, the vaporous hydrocarbon feed in conduit 74 is combined with catalyst of reduced activity in mix zone 72 and thereafter passed through a limited hydrocarbon conversion zone represented by conduit 76 for ultimate discharge in separator $C_9$. The partially converted hydrocarbon feed at an elevated temperature, is withdrawn from separator $C_9$ by conduit 66 for passage to mix zone 64 and further conversion in conduit 68.

Contaminated catalyst is withdrawn from separator $C_9$ at an elevated temperature approaching the temperature of the introduced fresh vaporous feed. The contaminated or spent catalyst in standpipe 78 is passed to mixing zone 80 wherein it is combined with a stripping gas introduced by way of conduit 82 to form a relatively dilute suspension thereof for passage upwardly through a dilute phase stripping zone represented by conduit 84. The suspension is discharged into a separator $P_{10}$ from which stripped products are withdrawn by conduit 88 and stripped catalyst by standpipe 86. The stripped products in conduit 88 are passed to the product recovery section for further treatment required to separate hydrocarbon product from stripping gas. The catalyst in standpipe 86 is passed to a mix zone 90 for contact with fresh stripping gas introduced by conduit 92 and form a suspension for passage through a second stage of stripping in conduit 94. The suspension in conduit 94 discharges into separator $P_{11}$ from which stripping gas and stripped product is recovered by conduit 82. Accordingly, the stripping section of the process employs the principle of general countercurrent flow of stripping gas and catalyst except for in the riser transfer zones 84 and 94. It is to be understood, of course, that more than two stages of stripping may be employed if desired and required.

The stripped catalyst in standpipe 96 and containing catalyst contaminants including carbonaceous deposits is passed to a mix zone 98 for contact therein with a gaseous regenerating medium introduced by way of conduit 100. In the specific embodiment herein described, the gaseous regenerating medium in conduit 100 is a gaseous product recovered from one or more previous regenerating steps described hereinafter, but this does not mean to say that the process is so limited or that fresh oxygen containing regeneration gas cannot be added to gaseous material introduced to mix zone 98. In the system herein described, it is intended to carry out a plurality of catalyst regeneration stages of the same or different temperatures in sequence designed to limited temperature rise in any one stage below that damaging to the catalyst activity but sufficiently high to effect substantially complete removal of carbonaceous material from the catalyst particles removed from the last regeneration stage and produce regenerated catalyst particles substantially uniform in activity.

The suspension formed in mix zone 98 of contaminated catalyst particles in an oxygen containing regeneration gas is passed through a dilute phase regeneration zone 102 under conditions to effect at least partial combustion of carbonaceous deposits on the catalyst. The suspension in conduit 102 is discharged into separator $R_{12}$ from which gaseous combustion products are removed by conduit 104. The partially regenerated catalyst is removed from separator $R_{12}$ by standpipe 106 connected to catalyst cooler 108. In cooler 108 the catalyst is partially cooled before being passed by conduit 110 to mix zone 112 for contact thereto with additional oxygen containing regeneration gas introduced thereto by conduit 114. In mix zone 112 a suspension of partially regenerated catalyst in oxygen containing regeneration flue gas is formed for passage through a second controlled stage of catalyst regeneration in regeneration zone 116 discharging into separator $R_{13}$. Regeneration flue gas is recovered from separator $R_{13}$ by conduit 100 for further use in the process as described above. The further regenerated catalyst is withdrawn from separator $R_{13}$ by conduit 118 connected to cooler 120. The partially regenerated catalyst is suitably cooled in cooler 120 before being passed by conduit 122 to mix zone 124. In mix zone 124 the catalyst is combined with oxygen containing flue gas in conduit 126 to form a suspension for passage through conduit 128 under catalyst regenerating conditions. The suspension in riser conduit 128 is discharged into separator $R_{14}$ from which regeneration flue gas is withdrawn by conduit 114. The further regenerated catalyst is withdrawn from separator $R_{14}$ by standpipe 130 connected to cooler 132. The cooled catalyst is then passed by conduit 134 to mix zone 136 wherein it is combined with an oxygen containing regeneration gas in conduit 138 to form a suspension for passage under regenerating conditions through conduit 140 to separator $R_{15}$. Regeneration flue gas is removed from $R_{15}$ by conduit 126 for further use in the process as described above. The regenerated catalyst is from separator $R_{15}$ by standpipe 142 and passed to cooler 144. The catalyst suitably cooled is then passed by conduit 146 to a mix zone 148 wherein a suspension is formed with a relatively cool carrier gas or vaporous medium introduced by conduit 150. The thus formed suspension is then passed by conduit 152 to a further trim cooler 154 on the front end of the process if required before passing the regenerated catalyst by conduit 2 to regenerated catalyst accumulation zone 4.

To facilitate the recovery of any entrained catalyst fines in the hydrocarbon product vapor recovered from separator $C_1$ it is contemplated employing more than one cyclone separator in series for this purpose. Therefore, the vaporous hydrocarbon material separated from the highly active catalyst in separator $C_1$ is withdrawn by conduit 156 and passed to a second stage of catalyst separation in zone 158. Catalyst separated from hydrocarbon vapors in zone 158 is withdrawn by standpipe 160 for passage to catalyst accumulation zone 4. The hydrocarbon vapors from which catalyst is removed in zone 158 is then passed by conduit 162 to a product fractionator 164 in the recovery section of the process.

An important aspect of the process arrangements shown and described herein resides in the heating of the fresh hydrocarbon feed to a sufficiently elevated temperature up to about 1050° F. for processing in the catalytic conversion steps provided. In the arrangement of FIGURE I the hydrocarbon feed material is heated in a suitable preheat furnace to an elevated temperature up to about 830° F. The thus heated feed is passed by conduit 186 to zone 188 containing a fluid mass of relatively inert finely divided contact material maintained at an elevated temperature sufficient to vaporize and heat the feed to elevated temperature up to about 1050° F. A suitable fluidizing or gasiform material may be added to the bottom of zone 188 by conduit 190. In zone 188, a plurality of desired functions are thereby accomplished which includes removing high boiling coke forming constituents from the feed and at least some of the feed metal contaminants. Furthermore, a suspension of oil vapors with inert particle material, such as sand, is formed which thereafter moves through conduit 192 to a separation zone 194. In separator 194 the vaporous oil feed is separated from the solid particulate material and passed thereafter by conduit 74 to the catalytic conversion step containing the least active conversion catalyst described above.

The finely divided contact material separated in 194 is withdrawn by standpipe 196 for passage to a mix zone 198 wherein a suspension is formed with a gasiform stripping medium introduced by conduit 200. The suspension formed in mix zone 198 is passed through a dilute phase stripping zone 202 for discharge into separator 204. Hydrocarbon material stripped from the inert solids and separated in 204 is removed by conduit 206. This material may be combined with the vaporous hydrocarbon feed in conduit 74 being passed to the catalytic conversion steps.

The stripped contact material is removed from separator 204 by standpipe 208 for passage to a mix zone 210. In mix zone 210 the inert contact material is combined with oxygen containing flue gas to form a suspension which is thereafter passed by regeneration zone 214 to separator 216. In separator 216 regeneration flue gas is separated from partially regenerated inert contact material and removed therefrom by conduit 218. The partially regenerated inert material contact material is then passed by standpipe 220 to mix zone 222 wherein it is combined with oxygen containing regeneration gas introduced by conduit 224 to form a suspension for passage through elongated regeneration zone 226 to separator 228. In separator 228, regeneration flue gas is separated from the inert contact material and removed by conduit 212 for further use in mix zone 210 as described above. The regenerated inert material after suitable cooling in zone 230 is passed by conduit 232 to zone 188. As in the catalyst regeneration stages discussed above, provision may be provided for increasing the oxygen content of the regeneration gas passed to each stage as a means of controlling the extent of burning and temperature rise accomplished in each stage of regeneration. Furthermore, partially and/or completely regenerated catalyst may be recycled to any one section for purpose of temperature control and/or increasing regeneration time of the catalyst in the sequence of regeneration steps.

On the regeneration side of the combination of processing steps, catalyst cooler 108, 120, 132 and 144 may be used to generate process steam. That is, water from steam drum 170 is passed by conduit 172 and suitable connecting conduits to the respective coolers 108, 120, 132 and 144. Steam formed in these coolers is collected through suitable connecting conduits and returned to steam drum 170 by conduit 174.

Referring now to FIGURE II by way of example, a reactor-regenerator 240 arrangement embodying the principle of a riser reactor 242 is shown for effecting the initial contact of hydrocarbon feed with finely divided particulate material. It is to be understood as discussed hereinbefore that the initial contact step may be accomplished in any of the well-known prior art systems which will permit or may be modified to permit the method of handling catalytic material as herein provided. In the arrangement of FIGURE II a stacked vessel arrangement 240 is shown provided with a riser contact zone 242 moving generally coaxially upwardly through the vessel. A hydrocarbon feed introduced by conduit 244 is heated in furnace 246 and thereafter passed by conduit 248 to the bottom of riser 242. In riser 242, the hydrocarbon feed is combined with catalyst obtained as hereinafter described to form a suspension which flow upwardly through the riser under elevated temperature conditions sufficient to vaporize the feed and effect at least partial conversion thereof to lower boiling products. The suspension in riser 242 is discharged into an enlarged separation zone 250 wherein catalyst particles are disengaged from hydrocarbon vapors by settling to form a bed of particles about the riser in the lower portion of the separation zone. A fluidizing gas suitable for effecting stripping of the catalyst particles is introduced to the lower portion of the bed of particles in the separation zone by conduits 252. Stripped particle material is withdrawn from the bottom of the bed and passed by a standpipe 254 to a bed of particles undergoing regeneration in a regeneration zone 256 therebelow. Cyclone separators 258 are provided for separating flue gases from regenerated particle material which is returned to the bed by suitable dip legs provided. Regeneration flue gas is withdrawn by conduit 260.

Cyclone separators 262 are provided in the upper portion of the separation zone 250 to assist with removal of particulate material from hydrocarbon vapors which are removed therefrom by conduit 264. The vaporous hydrocarbons in conduit 264 are passed to a mixing zone 266 wherein they are combined with catalytic material of a higher activity than that employed in riser 242 to form a suspension therewith having a temperature below the temperature of the hydrocarbon introduced thereto. The suspension formed in mix zone 266 moves through an elongated confined reaction zone 268 to a separation zone 270 which may be one or more connected cyclone separation zones. In separation zone 270 the major portion of the catalyst is separated from the hydrocarbon vapors.

The separated catalyst moves into a standpipe 272 which is employed to transfer the catalyst to the lower portion of riser 242 in an amount desired controlled, for example, by valve 274. The hydrocarbon vapors including product of conversion obtained from risers 242 and 268 are removed from separator 270 and passed by conduit 276 to mix zone 278. In mix zone 278 the hydrocarbon vapors are combined with an amount of the most active catalyst introduced by standpipe 282 and employed in the system to form a suspension having the desired conversion conditions to convert the hydrocarbons to desired products. The suspension formed in mix zone 278 is then passed through an elongated confined reaction zone 280 for conversion of the hydrocarbons to desired products before discharging into separation zone 284. Separation zone 284 may be a plurality of connected cyclone separation zone which will be adequate to effect a desired separation of catalyst particles from hydrocarbon vapors. The hydrocarbon vapors are removed by conduit 286 and passed to suitable product recovery equipment not shown. The catalyst particles separated in separator 284 of relatively high activity is passed by standpipe 288 to mix zone 266 described above. Accordingly, in the arrangement described above, the catalyst moves generally countercurrent to the hydrocarbon vapors through the plurality of riser contact zones so that the catalyst of lowest activity contact the fresh feed to the process at the highest temperature conditions and the partially converted hydrocarbons contact the most active catalyst particles under conditions to complete conversion thereof to desired products.

In the system thus described, the catalyst in conduit 272 although of relatively high activity is generally of a temperature below that desired in riser 242. Accordingly, to maintain a desired heat balance in the system, hot regenerated catalyst particles are removed from the bed of particles in regenerator 256 by conduit 290 provided with flow control valve 292 and communicating with the lower portion of riser conduit 242. The high activity catalyst particles in conduit 272 may be combined with the hot regenerated particles in conduit 290 being passed to riser 242 or they may be separately introduced to riser 242 as desired. On the other hand, the catalyst particles in conduit 272 may have insufficient carbon residue thereon to warrant contact with the fresh feed in riser 242 and therefore it is contemplated passing all or a part of this catalyst directly to the plurality of dilute phase regeneration stages provided to remove substantially all residual carbon therefrom. In this arrangement the catalyst system of a plurality of riser contact steps may be substantially separate from the catalyst system employing catalyst of substantially lower activity. In fact the arrangement permits the use of two different catalyst of substantially different activity in each system.

Accordingly, in the system of FIGURE II it is contemplated operating under conditions so that the catalyst employed in riser 242 and recycled thereto will for the most part have a higher residual coke thereon than the catalyst employed in the subsequent dilute phase cracking steps to effect selective cracking of insufficiently cracked hydrocarbon vapors recovered from riser conversion zone 242.

Therefore, regenerator 256 and the particles undergoing regeneration therein will generally be of a lower activity that the catalyst particles employed in the selective dilute phase cracking stages and the amount of heat generated therein by burning of carbonaceous deposits on the catalyst may be limited to essentially that required to effect the desired degree of vaporization in riser 242 by the mass of particles passed therefrom to the riser. Therefore, the regenerator conditions for regenerator 256 may be substantially less severe than those employed in the prior art since its operating conditions and burning capacity is not governed to maintain low residual coke requirement on the regenerated catalyst.

To provide the high activity catalyst of little or no residual coke thereon, a portion of the regenerated catalyst is withdrawn from regenerator 256 by conduit 294 containing flow control valve 296 to a mix zone 298. In mix zone 298, the partially regenerated catalyst withdrawn from regenerator 256 is combined with oxygen containing flue gas obtained as hereinafter described and of a desired oxygen content, under conditions to form a suspension at a temperature sufficient to effect at least partial burning of residual coke on the catalyst particles during its transfer through an elongated confined regeneration zone 302 to separation zone 304. Flue gas separated from catalyst particles in zone 304 is withdrawn by conduit 306. A portion of this flue gas may be directed to regenerator 256 by conduit 308 as shown.

The catalyst separated from flue gas in 304 is withdrawn by standpipe 310 communicating with mix zone 312 wherein the catalyst is contacted with fresh oxygen containing regeneration gas such as air introduced to the process by conduits 314 and 316. A portion of the air in conduit 314 may be passed into the lower portion of regenerator 256 by branched conduits 318 and 320 communicating with a suitable air distributor means in the lower portion of a dense fluid bed of particles therein.

In mix zone 312, the catalyst which has undergone partial regeneration is combined with an oxygen containing gas of sufficient oxygen concentration to effect a final removal by burning of any residual carbonaceous material remaining on the catalyst particles and restore its activity. The suspension formed in zone 312 is thereafter passed through an elongated regeneration 322 under elevated temperature regeneration conditions to separation zone 324. In separation zone 324, the regeneration catalyst is separated from oxygen containing flue gas and withdrawn by standpipe 326. The oxygen containing flue gas is withdrawn by conduit 300 for use as herein described. The regenerated catalyst in standpipe 326 is passed to a mix zone wherein the catalyst is combined with a suitable carrier gas introduced by conduit 330 to form a suspension which is conveyed by conduit 332 to a regenerated catalyst receiving zone 334. Heat may be removed from the regenerated catalyst during passage through conduit 332. Fluidizing gas may be introduced to the lower portion of the receiving zone by conduit 336.

It is to be understood that the number of elongated confined contact zones employed for the catalyst of highest activity may be varied considerably depending on the conditions employed in the several zones. Therefore, it is contemplated employing only one of these zones rather than two as specifically discussed herein or there may be more than two zones for the reasons discussed herein. Similarly, it is contemplated varying the number of riser dilute catalyst phase regeneration zones 302 and 322 to any desired number required to accomplish desired removal of residual coke deposits on the catalyst.

It is to be understood that a slurry stream may be recovered from a product fractionator under certain conditions of operation during which time it is desirable to pass the recovered slurry to the conversion stage of the process. Therefore, it is contemplated under these conditions of operation to recycle the slurry to the conversion step in the sequence of steps most suitable for handling this slurry material without materially affecting the normal operation thereof.

It can be seen from the above discussion that the method and arrangement of processing steps described provides catalyst systems of desired flexibility in operating variables, desired versatility in materials which can be processed and handled therein and a combination of processing equipment that optimizes installation and maintenance economies.

Having thus described our invention, various alteration and/or modification to the present invention will become apparent to those skilled in the art without departing from the scope of the invention.

We claim:

1. A method for converting hydrocarbons boiling above gasoline boiling range hydrocarbons with an aluminosilicate cracking catalyst which comprises passing a hydrocarbon feed with an aluminosilicate cracking catalyst through a first conversion zone maintained under conditions to effect not more than partial conversion of said hydrocarbon feed, separating catalyst from hydrocarbon product of said first conversion zone, stripping and regenerating said separated catalyst under conditions to effect not more than a partial removal of carbonaceous deposits on said separated catalyst, returning sufficient catalyst thus regenerated to said initial conversion zone to furnish a substantial portion of the heat required therein to vaporize said hydrocarbon feed and effect partial conversion thereof, passing another portion of said partially regenerated catalyst through a plurality of sequentially connected dilute catalyst phase regeneration zones maintained under regeneration conditions to effect substantially complete removal of carbonaceous deposits on said partially regenerated catalyst, passing catalyst thus regenerated through a sequence of separate dilute phase second conversion zones of increasing temperature in the direction of catalyst flow therethrough and passing vaporous hydrocarbons from said first conversion zone through said dilute phase conversion zones generally countercurrent to said catalyst flow and at a temperature matched to the activity of the catalyst to substantially inhibit undesired over cracking of hydrocarbon conversion products recovered from said previous conversion steps, recovering desired conversion products and catalyst from said dilute phase conversion steps and passing catalyst thus recovered to said first conversion zone.

2. A method for converting a hydrocarbon feed to gasoline boiling products which comprises operating an initial hydrocarbon conversion zone under conditions to effect vaporization of a hydrocarbon feed passed therethrough and a limited conversion thereof to lower boiling hydrocarbons in the presence of hot catalyst particles obtained from a catalyst first regeneration zone, operating said first regeneration zone under conditions to remove only a portion of carbonaceous deposits laid down during use in said initial conversion zone, recycling catalyst thus regenerated at an elevated temperature from said dense fluid catalyst bed regeneration zone to said initial conversion zone, passing another portion of said partially regenerated catalyst through at least one more second regeneration zone under conditions to effect substantially complete removal of all of said carbonaceous deposits from the catalyst particles, thereafter contacting said catalyst particles substantially free of carbonaceous material with vaporous hydrocarbons obtained from said initial conversion zone in at least one more second conversion zone at a temperature matched to the activity of the catalyst to minimize undesired overcracking of hydrocarbon products obtained from previous conversion steps, separating desired hydrocarbon conversion products and catalyst from said second conversion steps and combining catalyst of reduced activity from the last of said second conversion steps with the catalyst passed from said dense bed regeneration zone to said initial conversion zone.

References Cited

UNITED STATES PATENTS

| 2,425,555 | 8/1947 | Nelson | 208—156 |
|---|---|---|---|
| 2,459,836 | 1/1949 | Murphee | 23—1 |
| 2,475,650 | 7/1949 | Thompson et al. | 252—417 |
| 3,231,326 | 1/1966 | Stine et al. | 23—1 |

DELBERT E. GANTZ, *Primary Examiner.*

ABRAHAM RIMENS, *Examiner.*